(12) United States Patent
Maher

(10) Patent No.: US 12,117,107 B2
(45) Date of Patent: Oct. 15, 2024

(54) BEND LIMITER WITH MONITORING DEVICE

(71) Applicant: Trendsetter Vulcan Offshore, Inc., Houston, TX (US)

(72) Inventor: James V. Maher, Houston, TX (US)

(73) Assignee: Trendsetter Vulcan Offshore, Inc., Houston, TX (US)

( * ) Notice: Subject to any disclaimer, the term of this patent is extended or adjusted under 35 U.S.C. 154(b) by 57 days.

(21) Appl. No.: 18/124,504

(22) Filed: Mar. 21, 2023

(65) Prior Publication Data

US 2023/0296191 A1 Sep. 21, 2023

Related U.S. Application Data

(60) Provisional application No. 63/322,034, filed on Mar. 21, 2022.

(51) Int. Cl.
*F16L 3/01* (2006.01)
*E21B 33/076* (2006.01)

(52) U.S. Cl.
CPC ............ *F16L 3/01* (2013.01); *E21B 33/076* (2013.01)

(58) Field of Classification Search
CPC ............ F16L 3/01; F16L 1/123; E21B 33/076
USPC .......................................................... 248/49
See application file for complete search history.

(56) References Cited

U.S. PATENT DOCUMENTS

| 9,695,665 B2 | 7/2017 | Older et al. |
| 11,203,909 B2 | 12/2021 | Maher et al. |
| 11,732,821 B2* | 8/2023 | Nicoli Muschamp ............... F16L 3/1091 138/110 |
| 11,946,571 B1* | 4/2024 | Edwards, IV .......... F16L 57/00 |
| 2015/0136417 A1* | 5/2015 | Elliott ................. E21B 17/1078 166/377 |
| 2017/0328509 A1* | 11/2017 | Meijer ..................... H02G 1/10 |
| 2020/0018429 A1* | 1/2020 | Jackson ............... H02G 15/115 |
| 2021/0032938 A1* | 2/2021 | Stewart .................... F16L 1/123 |
| 2024/0167586 A1* | 5/2024 | Schimpf .................... F16L 3/01 |

* cited by examiner

*Primary Examiner* — Muhammad Ijaz
(74) *Attorney, Agent, or Firm* — Jonathan Pierce; Pierre Campanac; Porter Hedges LLP

(57) ABSTRACT

A system is used to reduce the bending moments in Coil Tubing ("CT"). The system includes a segmented and closable cage that can close around the CT. The cage includes rollers, such as elastomeric rollers, that can allow for both vertical translations of the CT and rotations of the CT around the vertical axis. The cage rests on a seat, such as an elastomeric seat, provided inside a cylindrical housing. In order to monitor the bending moments in the CT, the pins that hold in the rollers are preferably load pins. This bend limiting system can be located below the CT injector, at the vessel deck level, or in the moonpool. The bend limiting system can be used in offshore or land operations.

16 Claims, 4 Drawing Sheets

BEND LIMITER WITH MONITORING DEVICE

CROSS-REFERENCE TO RELATED APPLICATIONS

This application claims the benefit of priority to U.S. provisional application Ser. No. 63/322,034 filed on Mar. 21, 2022, which is incorporated herein by reference for all and any purposes.

FIELD AND BACKGROUND OF THE INVENTION

The disclosure relates generally to Coil Tubing ("CT"). The disclosure relates more particularly to a bend limiter, which preferably includes a device for monitoring the bending moments on the CT and a method of use thereof.

CT has been used for the performance of multiple types of hydraulic intervention, some of which involve the use of chemicals that promote rapid metal fatigue of the CT. For example, U.S. Pat. No. 9,695,665 describes a chemical injection system that includes CT. Regardless of the internal fluid contents, the bottom of the CT injector head is often not conducive to long-term deployment due to high-stress concentrations caused by bending moments and little ability to mitigate them.

There is a need in the art for a bend limiter for CT. Preferably, the bend limiter allows for the monitoring of the bending moments on the CT.

SUMMARY

The disclosure describes a bend limiter for CT.

The bend limiter may comprise a cage. The cage may include a first segment, a second segment, and an external flange. The cage may have an open configuration wherein the second segment is movable relative to the first segment. The cage may have a closed configuration wherein the second segment abuts against the first segment. For example, the second segment may be coupled to the first segment by a hinge so that the second segment is capable of rotating relative to the first segment about an axis of rotation. The second segment may include one of a plurality of hooks or a pin. The first segment may include the other of the plurality of hooks or the pin. In the closed configuration, each of the plurality of hooks may engage the pin. The external flange may include a first portion fixed to the first segment and a second portion fixed to the second segment. In the closed configuration, the first portion and the second portion may form a ring. Preferably, the ring may be located at a distal end of the cage along the axis of rotation.

The bend limiter may comprise a first plurality of rollers. For example, the first plurality of rollers may consist of three rollers. Each of the first plurality of rollers may be mounted to the first segment. Further, the bend limiter may comprise a second plurality of rollers. For example, the second plurality of rollers may consist of three rollers. Each of the second plurality of rollers may be mounted to the second segment. Each of the first plurality of rollers and/or each of the second plurality of rollers may include an elastomer wheel. In the open configuration, CT may be placed in contact with each of the first plurality of rollers and not in contact with any of the second plurality of rollers. In the closed configuration, CT may be placed in contact with the first plurality of rollers and the second plurality of rollers simultaneously. Also, in the closed configuration, the first plurality of rollers and the second plurality of rollers may allow for the CT to move relative to the bend limiter in a first direction. The first direction may be parallel to the axis of rotation of the second segment relative to the first segment.

Preferably, at least some of the first plurality of rollers may be mounted to the first segment via a corresponding one of a first plurality of load pins. For example, each of the first plurality of rollers may be mounted to the first segment via a corresponding one of the first plurality of load pins. Preferably, at least some of the second plurality of rollers are mounted to the second segment via a corresponding one of a second plurality of load pins. For example, each of the second plurality of rollers may be mounted to the second segment via a corresponding one of the second plurality of load pins. Each of the first plurality of load pins may allow measurement of a force applied to it. Similarly, each of the second plurality of load pins allows measurement of a force applied to it. Optionally, each of the first plurality of load pins may be located in one of a plurality of planes that is perpendicular to the first direction, and each of the second plurality of load pins is located in one of the plurality of planes.

The bend limiter may comprise a basket. The basket may include a housing having an internal shoulder. The housing may include a split cylinder and a tie-back capable of being connected to one of an injector head, a vessel deck, or a moonpool wall. The basket may further include an elastomer seat. The elastomer seat may be located above the internal shoulder. In the closed configuration, the cage may be capable of being introduced inside the housing. Also, in the closed configuration, the external flange may be capable of resting on the elastomer seat.

The disclosure describes a method of reducing bending moments in CT.

The method may comprise the step of providing a bend limiter, as described herein above.

The method may comprise the step of connecting the housing of the bend limiter to one of an injector head, a vessel deck, or a moonpool wall.

The method may comprise the steps of opening the cage of the bend limiter and then placing CT in contact with each of the first plurality of rollers and not in contact with any of the second plurality of rollers.

Then, the method may comprise the steps of closing the cage, placing the CT in contact with the first plurality of rollers and the second plurality of rollers simultaneously, and introducing the cage inside the housing.

Then, the method may comprise the step of moving the CT relative to the bend limiter in the first direction. During the movement of the CT, the method preferably, but not necessarily, comprises the step of monitoring the bending moments on the CT with load pins used to mount the first plurality of rollers on the first segment and the second plurality of rollers on the second segment. The operation of the CT may be adjusted based on the monitored bending moments.

BRIEF DESCRIPTION OF DRAWINGS

For a more detailed description of the embodiments of the disclosure, reference will now be made to the accompanying drawings, wherein.

DETAILED DESCRIPTION

Figure 1:
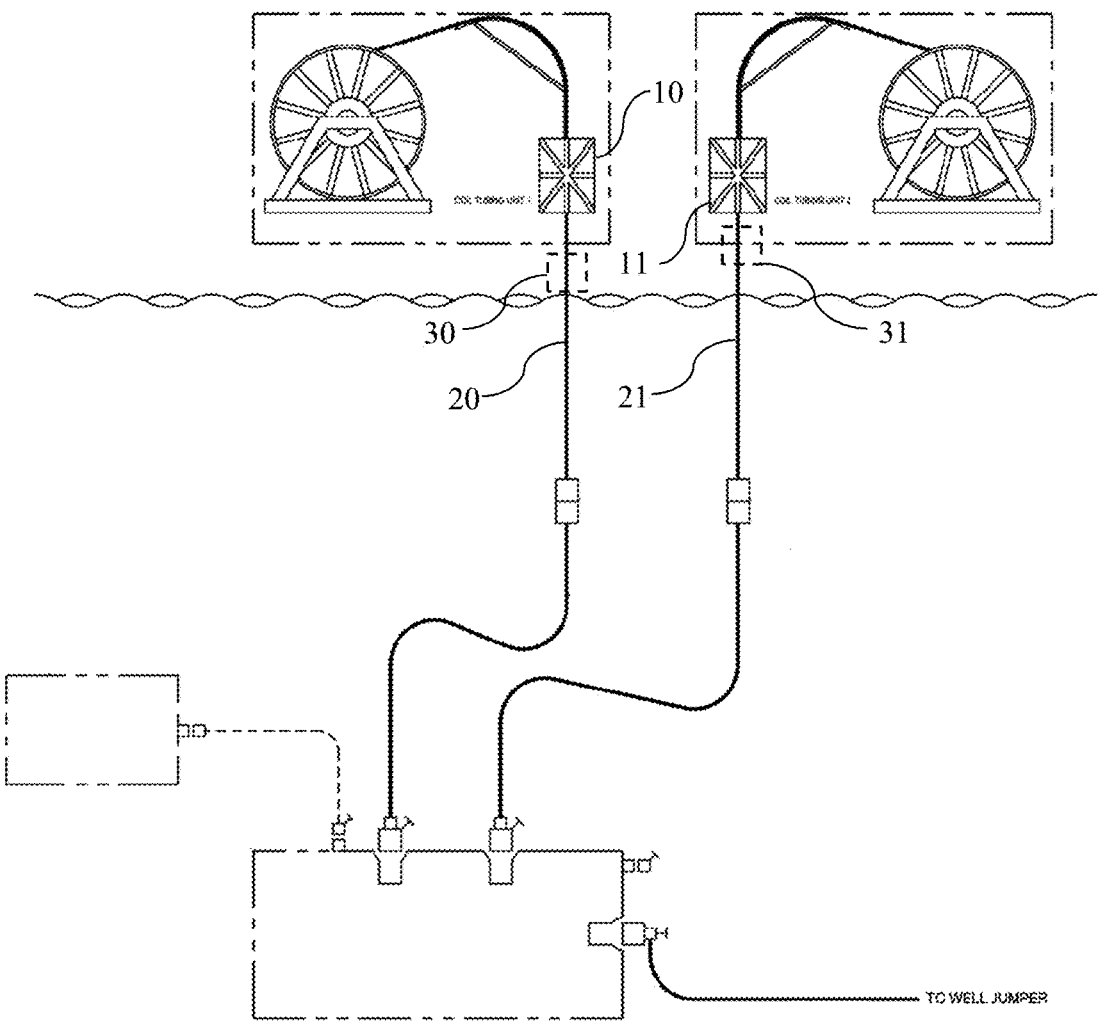
FIG. 1 is a schematic view of CT units involved in offshore operations where bend limiters can be used.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

The disclosure describes a bend limiting system or guide that can provide the ability to increase the effective fatigue life of CT by reducing the bending moments in CT.

Normal operations for CT include being able to adjust the length of CT deployed at various times in the operation, which requires any bend limiting system to be able to provide the ability to have CT move relative to the bend limiting system.

In addition to providing the bend limiting function, the bend limiting system can optionally also provide the capability to directly monitor the bending moments on CT. Current methods are approximate and do not monitor directly.

The bend limiting system includes a device, such as a segmented and closable cage or housing that can close around the CT, which will also provide movement of the CT, potentially both for vertical translations of the CT and rotations of the CT around the vertical axis. This can be accomplished by a number of means, some of which involve fixed elastomers and rollers, which are in the cage.

The preferred embodiment is to have elastomeric rollers, which will then allow the CT to be paid in or out. In this embodiment, the pins that hold in the elastomeric rollers can then be load pins, which will allow the direct measurement of the forces through the pins and therefore provide a direct measurement of the bending moment imparted by the CT on the bend limiting system. This bending moment can then be used to approximate the stresses in the CT.

Stresses in the CT are sometimes highly concentrated at the exit to the injector head. If these stresses can be reduced, the remaining fatigue problem can be greatly reduced.

This bend limiting system can be at several potential locations on the vessel. One potential location is directly below the CT injector head, which will act similarly to a riser stress joint with one end fixed. Another potential location is at the vessel deck level just below the CT injector head, in which case, some rotational stiffness will provide additional reduction of the stresses at the injector head location. A third potential location is in the moonpool itself, somewhere below the upper deck and above the keel of the vessel. Lateral support of the bend limiting system can be more complex to provide in this location, which can be solved either with the implementation of a track system on the moonpool wall or by restraining the movement of the bend limiting system through the use of taut lines that are connected back to the walls of the moonpool and tightened by lines to the surface of the vessel.

The bend limiting system can also be used in land operations.

Figures 2, 2A:
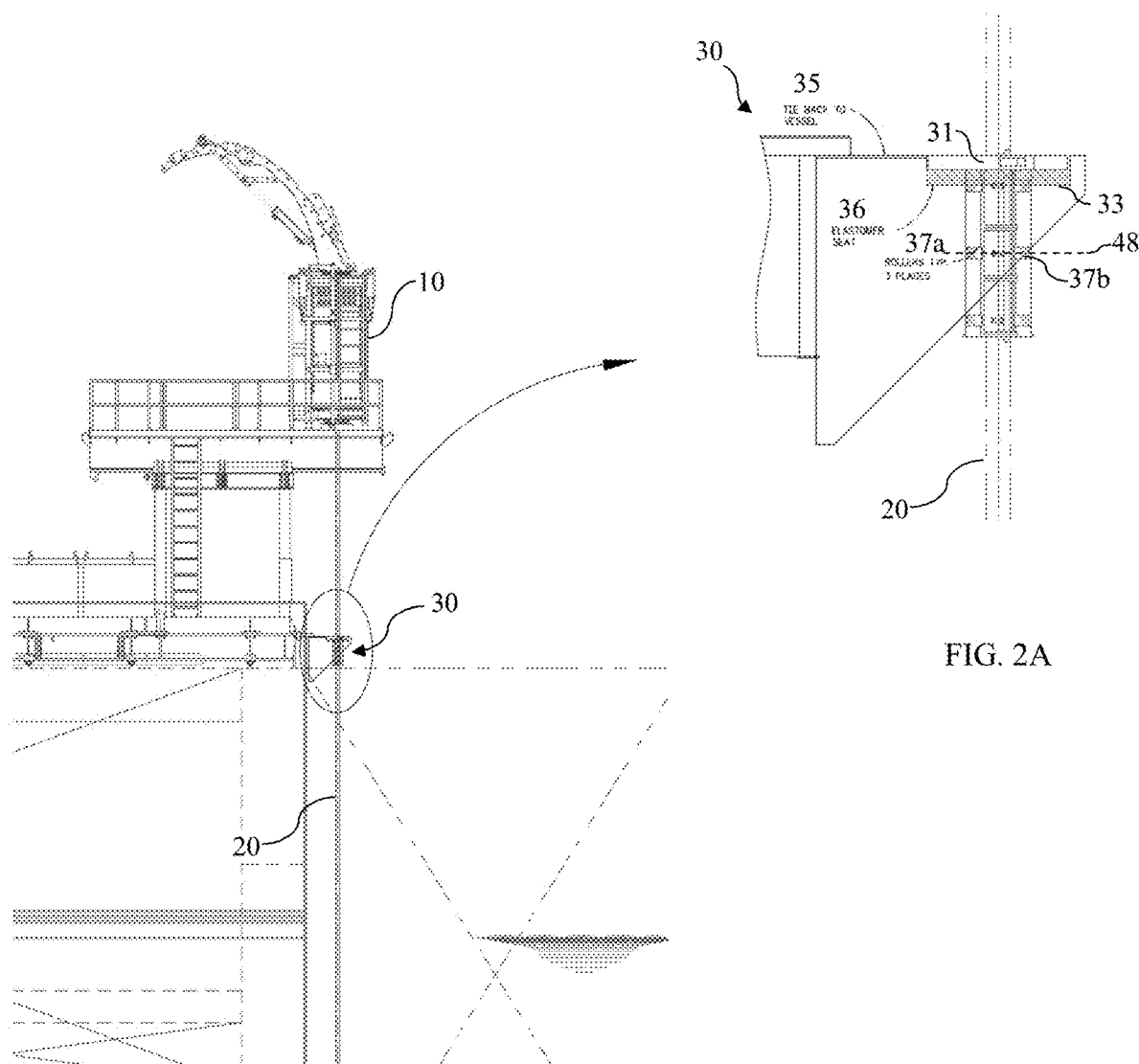
FIG. 2 is a front view of a CT unit shown in FIG. 1, where a bend limiter is used to reduce bending moments in a CT.
FIG. 2A is a sectional view of the bend limiter shown in FIG. 2, the bend limiter including a cage.

In reference to FIGS. 1 and 2, offshore operations involving bend limiters 30 and 31 are illustrated. Two CT units are located on the deck of a vessel (not shown). The first CT unit includes a CT injector head 10, through which CT 20 is injected. The second CT unit includes a CT injector head 11, through which CT 21 is injected. In the example shown, bend limiter 30 is connected to a vessel deck (shown in FIG. 2), and bend limiter 31 is connected to the bottom of CT injector head 11.

In other examples, bend limiter 30 can instead be connected to a moonpool wall (not shown). Also, several bend limiters can be connected along CT 20 and/or CT 21.

In reference to FIG. 2A, the bend limiter 30 comprises a basket 32 and a cage 34.

The basket 32 comprises a housing (e.g., including a tie-back 35 connected to the vessel deck) having an internal shoulder 33. The basket 32 also comprises an elastomer seat 36 located on top of the internal shoulder 33.

The cage 34 comprises an external flange 31. The cage 34 also comprises rollers (e.g., first rollers 37a and second rollers 37b in the same plane 48) that guide the CT 20 so as to limit its bending.

Figure 3:
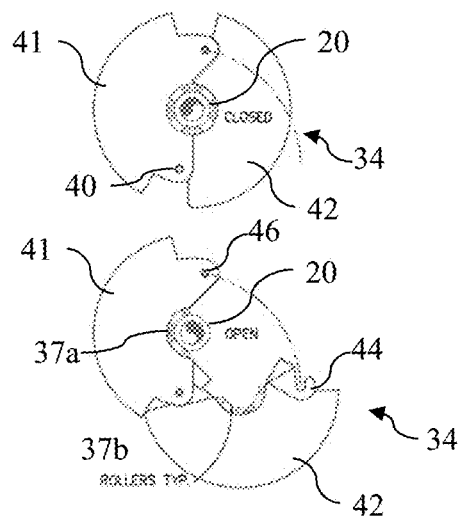
FIG. 3 shows bottom views illustrating the closed configuration (at the top of FIG. 3) and the closed configuration (at the bottom of FIG. 3) of the cage shown in FIG. 2A.
Figure 4:
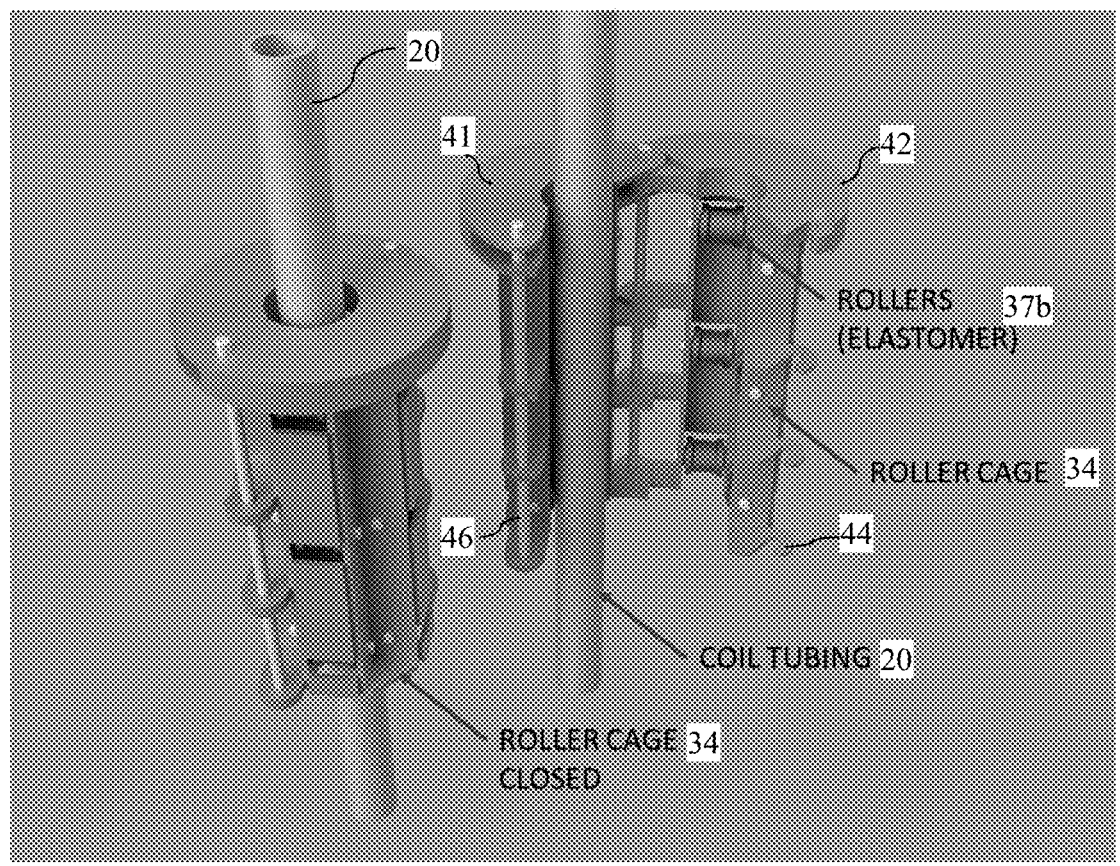
FIG. 4 shows perspective views illustrating the closed configuration (on the left of FIG. 4) and the closed configuration (on the right of FIG. 4) of the cage shown in FIG. 2A.

In reference to the top of FIG. 3 and the left of FIG. 4, the closed configuration of the cage 34 is illustrated. In reference to the bottom of FIG. 3 and the right of FIG. 4, the open configuration of the cage 34 is illustrated. The cage 34 moves from the closed configuration to the open configuration by rotating segment 42 relative to segment 41 around the axis of hinge 40. In the closed configuration, hooks 44 engage a pin 46.

Figure 5:
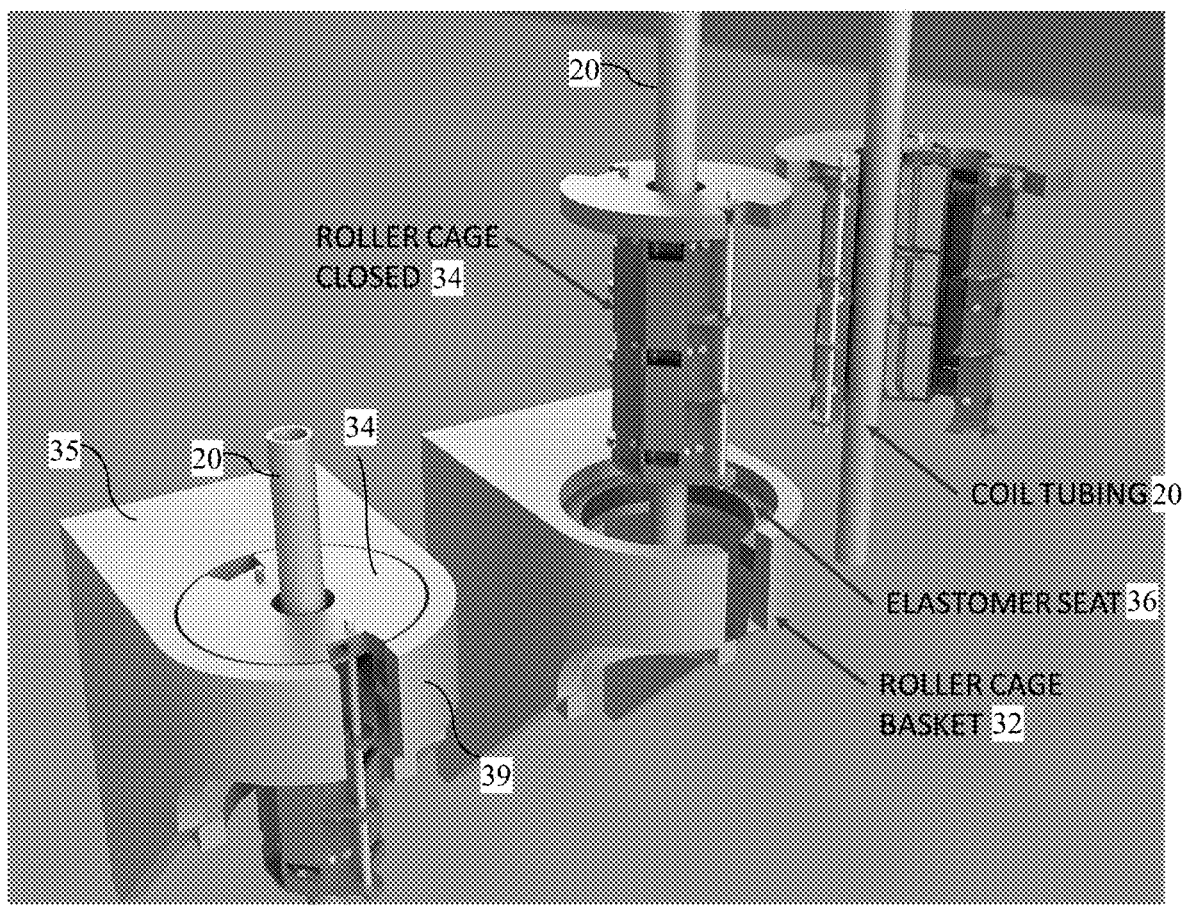
FIG. 5 shows a sequence of perspective views illustrating from right to left the installation of CT in a bend limiter.

In reference to FIG. 5, the cage 34 is closed on CT 20 (right of FIG. 5). Then, the CT is placed inside the housing of the basket 32 via a gap into split cylinder 39 (middle of FIG. 5). Then, the cage 34 rests on the elastomer seat 36 (left of FIG. 5).

The claimed invention is susceptible to various modifications and alternative forms, and specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A bend limiter for Coil Tubing (CT), comprising:
   a cage, including a first segment, a second segment, and an external flange;
   a first plurality of rollers mounted to the first segment;
   a second plurality of rollers mounted to the second segment; and
   a basket, including a housing having an internal shoulder;
   wherein the cage has an open configuration wherein the second segment is movable relative to the first segment, and CT can be placed in contact with each of the first plurality of rollers and not in contact with any of the second plurality of rollers;

wherein the cage has a closed configuration wherein the second segment abuts against the first segment, and CT can be placed in contact with the first plurality of rollers and the second plurality of rollers simultaneously;

wherein, in the closed configuration, the first plurality of rollers and the second plurality of rollers allow for the CT to move relative to the bend limiter in a first direction; and wherein, in the closed configuration, the cage is capable of being introduced inside the housing.

2. The bend limiter of claim 1, wherein the second segment is coupled to the first segment by a hinge so that the second segment is capable of rotating relative to the first segment about an axis of rotation.

3. The bend limiter of claim 2, wherein the first direction is parallel to the axis of rotation.

4. The bend limiter of claim 1, wherein the external flange includes a first portion fixed to the first segment and a second portion fixed to the second segment.

5. The bend limiter of claim 4, wherein in the closed configuration, the first portion and the second portion form a ring.

6. The bend limiter of claim 5, wherein the ring is located at a distal end of the cage along the first direction.

7. The bend limiter of claim 6, wherein the second segment includes one of a plurality of hooks or a pin, the first segment includes the other of the plurality of hooks or the pin, and, in the closed configuration, each of the plurality of hooks engages the pin.

8. The bend limiter of claim 1, wherein the housing includes a split cylinder and a tie-back capable of being connected to one of an injector head, a vessel deck, or a moonpool wall.

9. The bend limiter of claim 8, wherein the basket further includes an elastomer seat, wherein the elastomer seat is located above the internal shoulder, and wherein, in the closed position, the external flange is capable of resting on the elastomer seat.

10. The bend limiter of claim 1,
wherein at least some of the first plurality of rollers are mounted to the first segment via a corresponding one of a first plurality of load pins;
wherein each of the first plurality of load pins allows measurement of a force applied to it;
wherein at least some of the second plurality of rollers are mounted to the second segment via a corresponding one of a second plurality of load pins; and
wherein each of the second plurality of load pins allows measurement of a force applied to it.

11. The bend limiter of claim 10, wherein each of the first plurality of rollers is mounted to the first segment via a corresponding one of the first plurality of load pins, and each of the second plurality of rollers is mounted to the second segment via a corresponding one of the second plurality of load pins.

12. The bend limiter of claim 11, wherein each of the first plurality of load pins is located in one of a plurality of planes that is perpendicular to the first direction, and each of the second plurality of load pins is located in one of the plurality of planes.

13. The bend limiter of claim 12, wherein each of the first plurality of rollers and each of the second plurality of rollers includes an elastomer wheel.

14. The bend limiter of claim 13, wherein the first plurality of rollers consists of three rollers and wherein the second plurality of rollers consists of three rollers.

15. A method of reducing bending moments in Coil Tubing (CT), comprising:
providing a bend limiter, including:
a cage, including a first segment, a second segment, and an external flange;
a first plurality of rollers mounted to the first segment;
a second plurality of rollers mounted to the second segment; and
a basket, including a housing and an internal shoulder;
wherein the cage has an open configuration wherein the second segment is movable relative to the first segment;
wherein the cage has a closed configuration wherein the second segment abuts against the first segment; and
wherein, in the closed configuration, the first plurality of rollers and the second plurality of rollers allow for the CT to move relative to the bend limiter in a first direction;
connecting the housing to one of an injector head, a vessel deck, or a moonpool wall;
opening the cage;
placing CT in contact with each of the first plurality of rollers and not in contact with any of the second plurality of rollers after the cage is opened;
closing the cage;
placing the CT in contact with the first plurality of rollers and the second plurality of rollers simultaneously after the cage is closed;
introducing the cage inside the housing after the CT is placed in contact with the first plurality of rollers and the second plurality of rollers; and
moving the CT relative to the bend limiter in the first direction.

16. The method of claim 15, further comprising monitoring the bending moments on the CT with load pins used to mount the first plurality of rollers on the first segment and the second plurality of rollers on the second segment.

* * * * *